United States Patent
Rubin

Patent Number: 5,855,260
Date of Patent: Jan. 5, 1999

[54] TUNED BROADBAND PARTICULATE VIBRATION ABSORBER

[75] Inventor: Sheldon Rubin, Sherman Oaks, Calif.

[73] Assignee: The Aerospace Corporation, El Segundo, Calif.

[21] Appl. No.: 768,017

[22] Filed: Dec. 13, 1996

[51] Int. Cl.[6] .................................. B64C 1/00; F16F 7/10
[52] U.S. Cl. ........................ 188/379; 188/378; 244/119
[58] Field of Search .......................... 267/140.11, 140.4, 267/141.1, 141.4; 188/268, 378–380; 52/167.1–167.8; 248/559, 560, 562, 565, 636; 244/119

[56] References Cited

U.S. PATENT DOCUMENTS

| | | | |
|---|---|---|---|
| 3,604,306 | 9/1971 | Denholm | 267/140.4 |
| 4,014,588 | 3/1977 | Kohriyama | 267/141.4 |
| 4,576,366 | 3/1986 | Gallas et al. | 188/268 |
| 4,713,917 | 12/1987 | Buckle et al. | 52/167.1 |
| 4,754,958 | 7/1988 | Markowski | 267/141.1 |
| 5,067,684 | 11/1991 | Garnjost | 248/636 |
| 5,257,680 | 11/1993 | Corcoran et al. | 188/380 |
| 5,687,948 | 11/1997 | Whiteford et al. | 248/636 |

FOREIGN PATENT DOCUMENTS

| | | | |
|---|---|---|---|
| 1392277 | 4/1988 | U.S.S.R. | 188/378 |

OTHER PUBLICATIONS

"Mechanical Impedance Approach to Engine Vibration Transmission Into an Aircraft Fuselage", S. Rubin & F.A. Biehl, SAE Transactions, 1968, pp. 2711–2719.

"Passive, Adaptive and Active Vibration Absorbers—A Survey", J.W.Sun, M.R. Jully & M.A. Norris, Transactions of the ASME, vol. 117, pp. 234–242, Jun. 1995.

"A New Racket Shakes Up Tennis", S. Ashley, Mechanical Engineering, pp 80–81, Aug. 1995.

*Primary Examiner*—Robert J. Oberleitner
*Assistant Examiner*—Chris Schwartz
*Attorney, Agent, or Firm*—Derrick Michael Reid

[57] ABSTRACT

Broadband particulate absorbers include a suspended container for containing particulate beads that absorb vibration energy over a broad bandwidth so reduce coupled vibrations of mechanical systems over the broad bandwidth. The absorbers preferably include two opposing aluminum containers for containing particulate teflon beads. The aluminum containers are suspended and separated by aluminum I-beams attached to stringers of a rocket subjected during lift off to atmospheric pressure vibrations exerted on the vehicular skin coupling vibration through the stringers to trusses supporting sensitive inertial navigation payloads. The absorbers can be finely tuned using variably thick mass or various amounts of beads for reducing peak vibrations coupled into the payloads.

11 Claims, 4 Drawing Sheets

Tuned Absorber Assembly

Tuned Absorber Assembly

Absorption Configuration

Rocket Absorption System 5,855,260

TUNED BROADBAND PARTICULATE VIBRATION ABSORBER

STATEMENT OF GOVERNMENT INTEREST

The invention was made with Government support under Contract No. F04701-93-C-0094 by the Department of the Air Force. The Government has certain rights in the invention.

The invention described herein may be manufactured and used by and for the government of the United States for governmental purpose without payment of royalty therefor.

FIELD OF THE INVENTION

The invention relates to the field of mechanical vibration reduction treatments. More specifically, the invention relates to broadband vibration absorbers for reducing the vibration response of mechanical systems in one or more specific frequency bands governed by the tuning of the absorbers.

BACKGROUND OF THE INVENTION

Vibration isolation has long been used in mechanical systems to reduce vibration of elements which are sensitive to severe vibration. Flexible supporting devices called vibration isolators, typically employing elastomeric springs, are commonly used to support equipment items. Their purpose is to reduce the transmission of vibration between an equipment item and its supporting structure. The vibration source may be within the equipment, such as a motor, and the isolation serves to reduce the vibration transmitted to the supporting structure. Or, the equipment may need protection from vibration emanating from the supporting structure. In some cases viscoelastic spacers, such as rubber washers, have been disposed in the transmission path between a source of vibration and a coupled object to reduce the transmitted vibrations to the object. The rubber washers favorably change the resonant vibration characteristics of the system and absorb energy to effect vibration reduction where desired. For example, U.S. Pat. No. 5,350,173 discloses a resilient insert installed into the rim of a tennis racket head to reduce head vibrations during play.

In a submarine application, the hull supports an equipment truss containing sources of vibration. The truss is made of tubular members which have been experimentally filled with polyethylene beads for reducing noise vibration transmitted to the hull and generated in to prevent underwater sonar detection of the submarine. Low-density polyethylene beads were used for internal vibration energy absorption to reduce the propagation of vibration noise over a broadband of high frequencies. Unlike the invention herein disclosed, the particulate beads were not suspended within a tuned mass to create a tuned vibration absorber to be maximally effective in a desired frequency band.

In an application to a DC-9 aircraft, four suspended all-metal tuned vibration absorbers were elastically attached to the fuselage at the forward attachment points of the engines. The purpose of the absorbers was to reduce fuselage vibration resulting from vibration induced by unbalances of rotating shafts within the engines. The desired result, to significantly reduce the noise disturbing passengers at the rear of the cabin was achieved. The all-metal absorbers had limited energy absorption capacity which led to a narrower than desired frequency bandwidth of vibration reduction. Each suspended absorber mass was threaded onto a metal suspension rod which served as the spring. The variable positioning of the mass along the rod allowed fine tuning of the frequency of maximum absorption. The disadvantage resulting from the limited damping of these absorbers was the greater than desired loss of effectiveness of the absorbers due to slight mistuning. This imposed an undesirable tight tolerance on initial tuning and limited the length of service between adjustments of tuning to maintain effectiveness. For these reasons the absorbers saw limited application by the airlines.

In a rocket application, high vibrations are experienced during transonic flight due to high fluctuating aerodynamic pressure on the rocket skin. In a compartment of the vehicle containing equipment vulnerable to the induced vibration, the skin is supported by axially oriented stringers which are I-beams and serve to support the skin. A plurality of such stringer I-beams are equiangularly attached and disposed in parallel to support the interior of the rocket skin and also serve to support internal trusses which carry sensitive electronic payload equipment items. At vibration resonances of the skin-stringer-truss-equipment mechanical system, the vibration response of the equipment tends to be most intense and can cause mechanical damage or improper equipment operation, for example navigation errors of a guidance computer. Viscoelastic damping material was applied to skin, stringers, and truss to dissipate vibrational energy but failed to provide sufficient vibration reduction in an especially critical band of frequencies. This lack of effectiveness and other disadvantages were corrected using the present invention.

SUMMARY OF THE INVENTION

An object of the invention is to provide reduction in vibration at the position of its installation in a mechanical system in one or more specified frequency bands.

Another object of the invention is to provide vibration reduction for a coupled object in one or more specified frequency bands by reducing the transmission of vibration energy between a vibration source and that coupled object.

Another object of the invention is to increase the bandwidth of effectiveness of a tuned vibration absorber by increasing its internal damping.

Yet another object of the invention is to provide vibration absorption to reduce vibration levels in a mechanical system over a broad bandwidth.

Still another object of the invention is to attach a tuned suspended broadband particulate vibration absorber to a mechanical system for reducing vibration levels over a broad bandwidth.

Still another object of the invention is to fine tune a suspended broadband particulate vibration absorber to maximize the vibration reduction at a particular frequency in a mechanical system.

A further object of the invention is to attach particulate absorbers to a mechanical system disposed between a vibration source and a coupled object for reducing vibration severity at particular frequencies by tuning the absorbers to those frequencies, for broadening the bandwidth of vibration reduction adjacent to those frequencies, and for reducing vibrations in general over a broad band of frequencies.

The invention covers a suspended particulate tuned mass vibration absorber which when attached to the mechanical system reduces the vibration over a broad bandwidth at a coupled object. The mechanical system is excited by a vibration source and the induced vibration propagates through the mechanical system to the object. The mechanical system has resonances which when stimulated by a vibration source provides a vibration response profile to the object. The suspended particulate mass vibration absorber absorbs vibration energy to reduce the vibration response profile over a broad bandwidth. The suspended particulate tuned absorber reduces vibrations in frequency bands determined by the tuning and so reduces propagation from the vibration source through the mechanical system to the object.

In the preferred form of the invention which has undergone considerable testing, the suspended particulate mass vibration absorber is a tuned absorber assembly including two beams suspending and separating two opposing containers filled with plastic beads. The tuned vibration absorber assembly beams are attached to a vibrating element of a mechanical system. The tuned vibration absorber provides a high damping force profile having a broad bandwidth around the tuning frequency which will effectively reduce the vibration response profile. In a preferred application, the mechanical system is a support structure of a space rocket. The mechanical system includes the rocket skin, supporting stringers and payload trusses. A plurality of tuned absorber assemblies are respectively attached to a plurality of equiangularly disposed support stringers. The vibration source includes intense atmospheric pressure fluctuations acting upon the skin and the object is sensitive navigation equipment disposed upon the internal trusses. In a particular application, the equipment vibration has a maximum around 200 Hz and the absorber is tuned to 200 Hz. As each stringer vibrates its respective absorber beams, the beams flex and cause high vibrational motion of the containers and the internal plastic beads which absorb vibration energy to reduce the vibrations of the stringers, and hence vibrations coupled to the payload. Beam flexing and particulate energy absorption function to also reduce the vibration response profile of the rocket mechanical system over a broad band of higher frequencies well above the tuning frequency, for example 350–1000 Hz. Tuning masses may be preferably disposed onto the bead containers to finely tune the absorber to achieve maximum vibration reduction at the desired frequency. These and other advantages will become more apparent from the following detailed description of the preferred embodiment.

DETAILED DESCRIPTION OF THE PREFERRED EMBODIMENT

Figure 1:
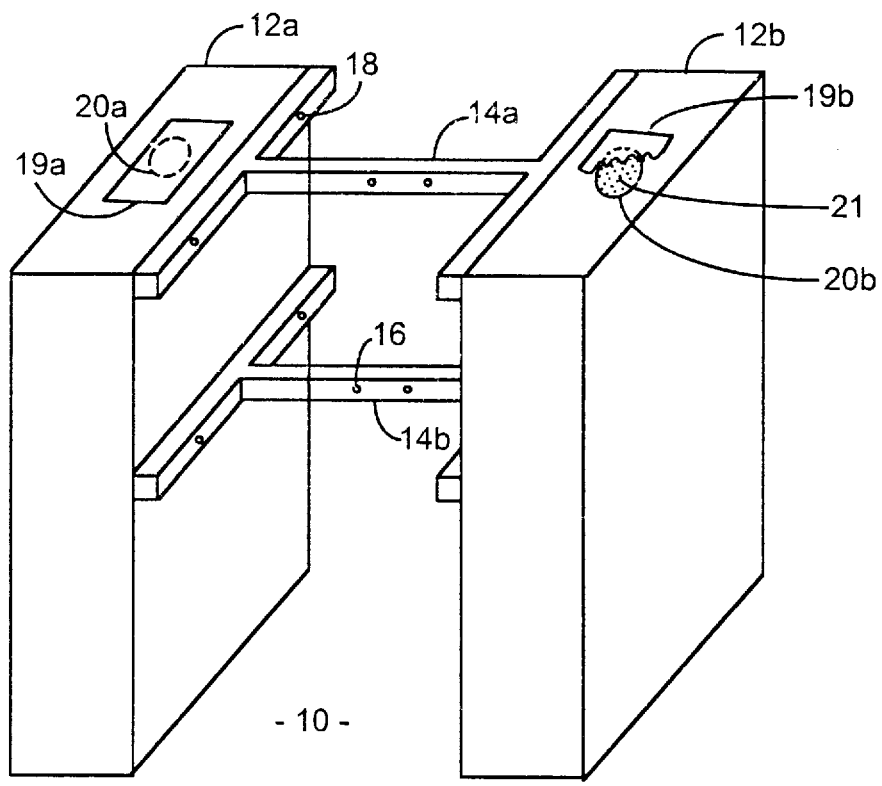
FIG. 1 shows a tuned particulate vibration absorber.

An embodiment of the invention is described with reference to the figures using reference designations as shown in the figures. Referring to FIG. 1, a tuned particulate vibration absorber 10 comprises containers 12 suspended and separated by a pair absorber beams 14a and 14b. Bolt apertures 16, only one of each is designated for clarity, is used to fasten the beams to an element of a mechanical system, not shown. Screws 18, only one of which is designated for clarity, are used to secure the beams 14 to the bead containers 12. The containers 12a and 12b have respective lids 19a and 19b covering respective apertures 20a and 20b for filling and containing vibration energy absorbing particulates 21 within the containers 12. The particulates 21 are preferably small relative to the dimensions of the container 12 and are generally shaped like flattened spheres which absorb vibration energy when activated by container vibration into vibratory rubbing between the beads. The containers 12 are substantially filled, but not compressively packed, with the beads 21, so that the beads 21 have a free surface to facilitate bead motion within the containers 12 which function like a bead shaker. The covering lids 20a and 20b are respectively secured over the apertures 19a and 19b and to the container 12 using any suitable fastening means such as glues, screws and welds, to contain the beads 21 within the containers 12 during vibration. The beads 21 function to absorb energy when vibrated without escaping from the containers 12.

The beads 21 are preferably commercial stock plastic beads of the type commonly available for plastic injection molding of commercial plastic parts. In space rocket application, the beads are preferably teflon beads TFZL-200, which are inert and do not substantially outgas chemical products subsequent to manufacture and disposition within the containers 12. The beads 21 are made of a stable material that maintains its physical properties preferably over a wide temperature range and for a long life time. The beads may be made of teflon, polystyrene, polyethylene, or any other suitable particulate material that absorbs vibration energy when vibrated to cause rubbing between the beads. The containers 12 and beams 14 may be made from a variety of materials, including metals, composite material, ceramics and plastics, but are preferably rigid and light weight. For example, the containers and beams can be made of aluminum, which is well suited for a wide variety of applications, such as in space rockets where weight and rigidity are important. The containers 12 are shown preferably as generally rectangular volumes, but other suitable volumetric shapes may be used. The containers 12 may be, for example, 6×4×1.75 inch volumes of ⅛ inch formed aluminum sheets separated to 5.5 inches by aluminum beams 14a and 14b, themselves separated by 3 inches. The beams 14 have a ½ inch square cross-section, but other suitable shapes may be used to separate and suspend the containers 12. Two beams 14 and two containers 12 are shown, but any number of beams 14 and containers 12 may be used to suspend any number of volumes of vibration absorbing particulates.

Figure 2:
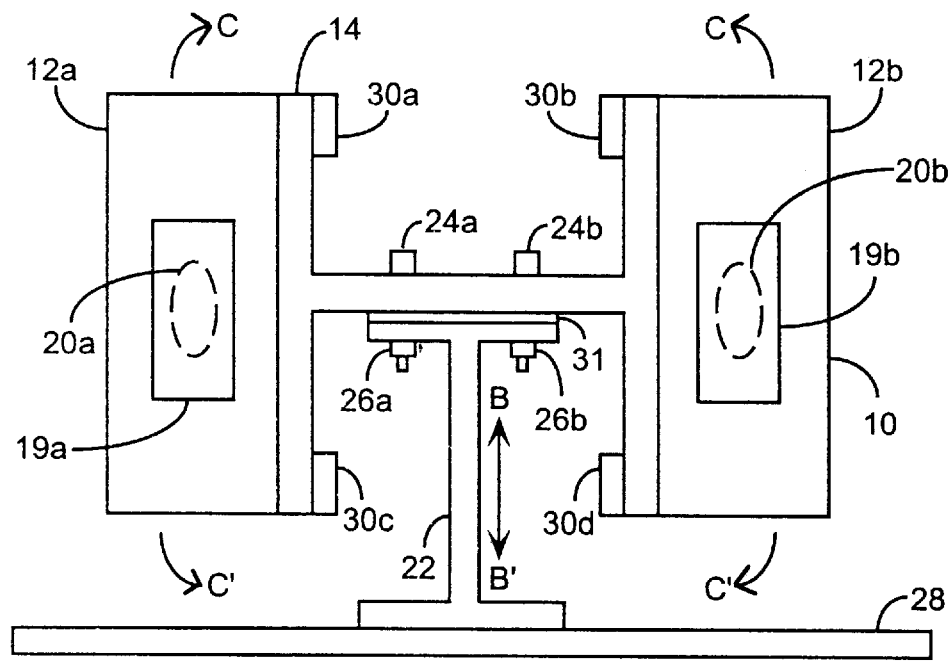
FIG. 2 shows a tuned absorber configuration.

Referring to FIGS. 1 and 2, and particularly to FIG. 2, the particulate vibration absorber 10, including the beams 14 and containers 12, have secured lids 19 covering bead aperture 20b to prevent the beads 21 from escaping the containers 12 when in use and when vibrated. The containers 12 and beams 14 are shown in a preferred "T" tuned absorption configuration by attachment to an I-beam standoff 22 using bolts 24a and 24b respectively having nuts 26a and 26b for attachment within the bolt apertures 16. The standoff 22 is shown attached to a support 28. The support 28 couples vibrations A–A' from a vibration source 29 to the standoff 22 which then undergoes vibrations B–B' and couples vibrations through the beams 14 and containers 12 which undergo vibrations C–C' transmitted into the beads 21 which then absorb vibration energy to reduce the vibrations B–B' and C–C'. Tuning masses 30a, 30b, 30c and 30d may be attached to each of the beams 14a and 14b, for a total of eight masses 30, to finely tune the resonant frequency of the absorber 10 when connected to standoff 22 and support 28. The masses 30 are preferably a dense metal, such as lead as used for balance weights for automobile wheels. The weight of the masses 30 is selected to provide a slight shift of the absorber resonant frequency to adjust the frequency of maximum damping effectiveness as needed for best vibration reduction in the mechanical system. The masses 30 serve to adjust the frequency of the absorber to overlay the frequency desired to most reduce the vibration response profile experienced by the mechanical system in the absence of the absorber. Alternatively, a fine tuning means 31 may be disposed between the suspension means and the mechanical system for providing for fine tuning the absorber to provide a peak in dampening for reducing a peak in the coupled vibrations. The fine tuning means 31 may be a shim having a desired thickness for fine tuning the absorber to provide a peak in dampening to reduce a peak in the coupled vibrations.

As the support 28 is vibrated in the A–A' direction by an external vibration source 29, the vibrations B–B' are induced into the standoff 22. As the standoff 22 is vibrated in the direction B–B', both of the containers 12 are vibrated symmetrically relative to the standoff in the arc directions C–C' which induces vibrations of the beads 21 within the containers 12. The beads 21 absorb vibration energy when vibrated in the C–C' direction. In the preferred application, the standoff 22 is an aluminum I-beam stringer and the support 28 is the aluminum skin of a space rocket. The stringers 22 are elements of a space rocket infrastructure to which respective tuned particulate vibration absorbers 10 are attached. Each of the masses 30 may be an exemplar lead weighing up to ⅕ pound.

Figure 3:
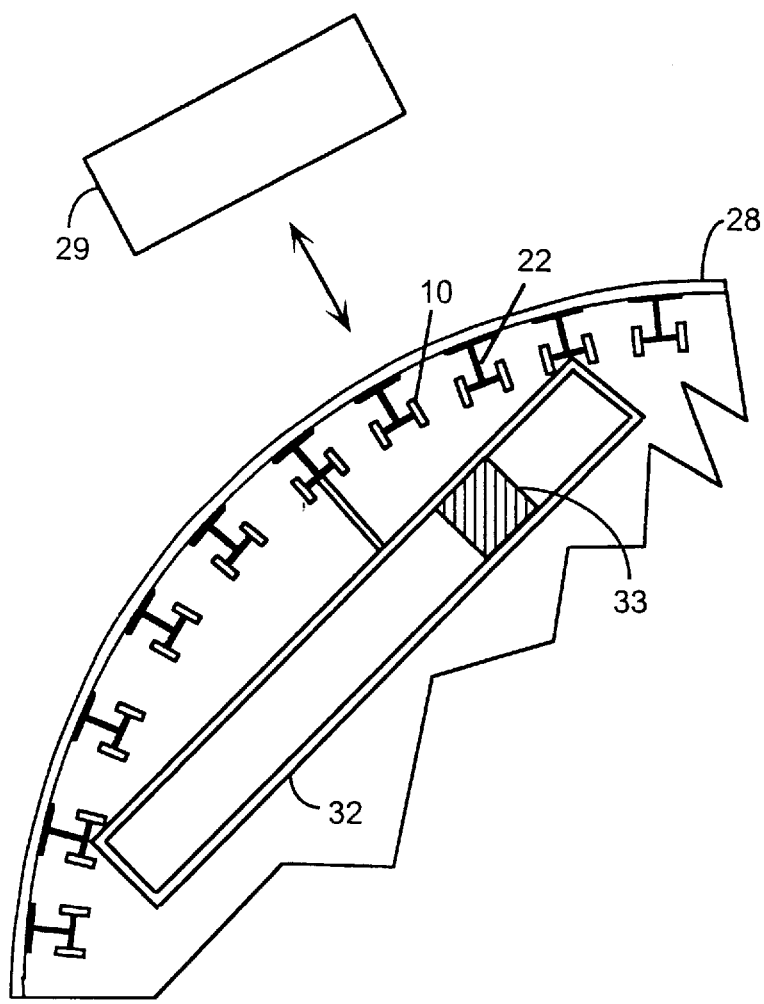
FIG. 3 shows a rocket vibration absorption system.

Referring to FIGS. 1–3, and particularly to FIG. 3, a portion of a space rocket infrastructure is shown as an exemplar mechanical system including the outer rocket skin 28, a plurality of skeletal support stringers 22 attached to a truss 32. The support stringers 22 are preferably shown with respectively attached tuned particulate vibration absorbers 10, only one of each is designated for clarity. The stringers 22 are shown in equiangular positions disposed about the rocket skin 28. Attached to stringers 22 is the truss 32 which is made of 1.4 inch square aluminum tubing welded together to form an equipment platform onto which is supported an object 33 which may be a vibration sensitive equipment such as 24 an inertial gyro navigation unit. The object 33 is thereby coupled to the rocket infrastructure defining the exemplar mechanical system having a natural vibration response. The particulate vibration absorbers 10 are attached to elements 22 of the mechanical system preferably shown as attached to stringers 22 of the rocket infrastructure including the skin 28, stringers 22 and truss 32. The rocket infrastructure is shown disposed between the vibration source 29 inducing vibrations A–A', and the payload object 33. The vibration source 29 induces vibrations A–A' such as those from external atmospheric air pressure fluctuations on the skin 28 especially those vibrations induced during transonic flight of the rocket. The infrastructure mechanical system 28, 22 and 32 couples pressure fluctuations A–A' from the vibration source 29 to the payload object 33. Particularly and preferably, a plurality of particulate vibration absorbers 10 are respectively attached to a plurality of stringers 22, as shown, and function to reduce the vibration response profile of the mechanical system to reduced the vibrations on the object 33 over a broad bandwidth.

Figure 4:
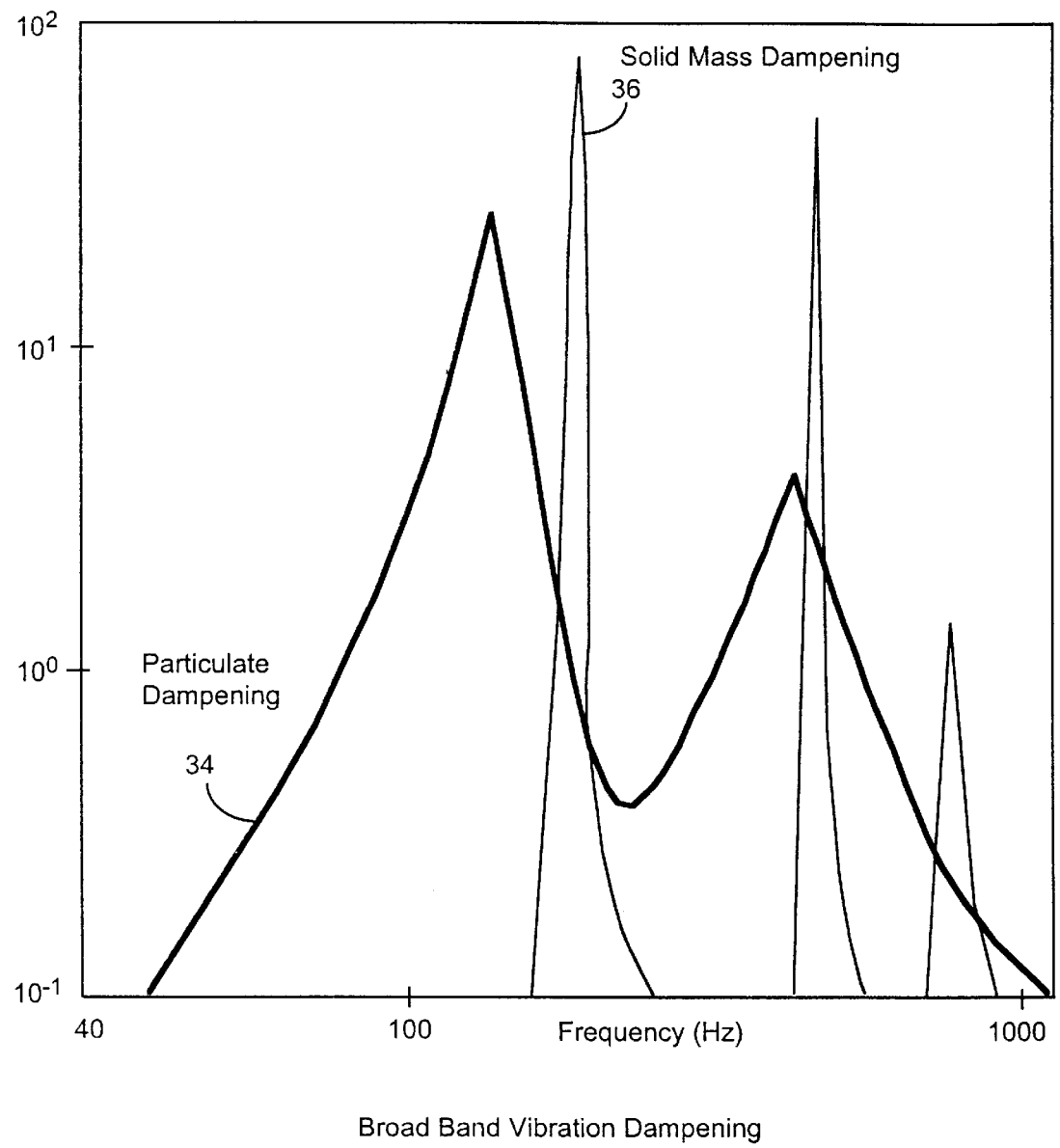
FIG. 4 is a graph showing particulate damped and all-metal damping force profiles produced by the absorber.

Referring to FIG. 4, the vibration damping produced by a 24 tuned suspended particulate vibration absorber 10 and the same absorber without the beads in the two containers is here described for purposes of comparison. A vibration source provides a vibration stimulation profile which varies with frequency. A mechanical system has its natural response characteristics which also vary with frequency. Depending on the natural resonant response and the vibration stimulation profile, the vibration response may have several peaks over a broad band. When a vibration absorber is attached to the mechanical system, the vibration response is reduced at those frequencies where damping is provided by the absorbers. As shown, the no-bead damping profile is characterized as a narrowband damping profile having narrowband peaks in between which lesser vibration damping occurs. As shown, the particulate damping profile is characterized as a broadband damping profile. When particulate vibration absorption is used, vibration damping occurs over a broadband, for example, within about 10% of the peak values between 100 and 600 Hz.

During the critical period of transonic flight, when atmospheric air pressure fluctuations are most severe, sensitive navigation equipment are subjected to vibrations over a broadband as well has being subject to peak vibration levels at particular vibration frequencies, which may faulty operation of precision navigation equipment. The particulate vibration absorption is used to generally reduce vibrations over a broad band, and to reduce peak vibrations at particular frequencies.

By varying the amount of beads in the container, and by varying the weight of the tuning masses, the dampening profile can be modified to overlay peak damping onto peak vibration responses.

Those skilled in the art recognize that precision modeling of a complex mechanical systems is difficult, and that introducing vibration damping is widely considered to be an art form, such that, often empirical data is used to determine size of an absorber. The natural response of mechanical systems may widely vary over different configurations, and well as from one production unit to the next production unit, such that respective individual absorbers are modified, by trial and error using empirical test data, respectively, to match the absorbers to the respective system. The particulate vibration absorber has many possible configurations including various materials, sizes, volumes, amounts, positions and numbers of containers, beams and beads, to provide a broadband damping profile. The suspended particulate absorbers provide damping over a broad bandwidth using many possible configurations and materials. The suspended particulate absorber assemblies are considered easy to construct. The particulate vibration absorbers are also tunable to match the vibration response of an attached mechanical system.

The invention covers tuned particulate vibration absorbers. Those skilled in the art can make enhancements, improvements and modifications to enhance the invention. However, those enhancements, improvements and modifications may nonetheless fall within the spirit and scope of the following claims.

What is claimed is:

1. An absorber attached to a mechanical system having a vibration response and disposed between a vibration source providing source vibrations and an object receiving coupled vibrations, the absorber for reducing the coupled vibrations, the absorber comprising a container means for defining a contained volume, a suspension means for suspending and attaching the container means to the mechanical system for coupling the source vibrations to the container means, and viscoelastic particulate means disposed within the contained volume of the container means for viscoelastically absorbing energy of the source vibrations for reducing the coupled vibrations over a broad bandwidth.

2. The absorber of claim 1 wherein, the container means is a pair of containers, the suspension means is for separating the pair containers from each other, for suspending the pair of containers from the mechanical system, and for attaching the pair of containers to the mechanical system.

3. The absorber of claim 1 wherein, the container means is a pair of aluminum rectangular containers, and the suspension means comprises an aluminum beam for separating the pair of containers from each other, for suspending the pair of containers from the mechanical system, and for attaching the pair of containers to the mechanical system.

4. The absorber of claim 1 wherein, the mechanical system comprises a rocket skin, a stringer attached to the rocket skin and a truss attached to the stringer, the object is a payload supported by the truss, and the source of vibration is atmospheric air pressures upon the rocket skin, the absorber is attached to the stringer, and the suspension means is attached to the stringer for suspending the container means from the mechanical system and for attaching the container means to the mechanical system.

5. The absorber of claim 1 further comprising, a fine tuning means disposed between the suspension means and the mechanical system for providing for fine tuning the absorber to provide a peak in dampening for reducing a peak in the coupled vibrations.

6. The absorber of claim 1 further comprising, a shim disposed between the suspension means and the mechanical system having a desired thickness for fine tuning the absorber to provide a peak in energy absorption within the broad bandwidth to reduce the peak in the coupled vibrations.

7. The tuned absorber of claim 1 wherein the viscoelastic particulate means is a volume of plastic beads.

8. The absorber of claim 1 further comprising a plurality of weight means disposed on respective ends of said suspension means for fine tuning the absorber to provide a peak in dampening for reducing a peak in the coupled vibrations.

9. A plurality of absorbers disposed in a rocket having a mechanical system comprising a rocket skin, a plurality of stringers attached to the rocket skin and a truss attached to at least one of the plurality of stringers, a payload is supported by the truss, the payload receiving coupled atmospheric pressure vibrations coupled through the mechanical system, the plurality of absorbers are for reducing the coupled vibrations, each absorber is attached to a respective stringer, each absorber comprising, a container means for defining a contained volume, a suspension means for suspending and attaching the container means to the respective stringer for coupling the vibrations to the container means, and particulate means disposed within the contained volume of the container means for absorbing energy of the vibrations for reducing the coupled vibrations over a broad bandwidth.

10. The plurality of absorbers of claim 9, wherein the container means is a pair of aluminum rectangular containers, the suspension means is a pair of aluminum beams for separating, suspending and attaching the pair of containers to the respective stringer, the broad bandwidth is 350 to 1000 Hz, and the particulate means is a volume of plastic beads.

11. The plurality of absorbers of claim 9, wherein each absorber further comprises, a mass disposed between the suspension means and the respective stringer and having a desired thickness for fine tuning the absorber to provide a peak in dampening to reduce a peak in the coupled vibrations.

* * * * *